US009989936B2

(12) United States Patent
Kumagai et al.

(10) Patent No.: US 9,989,936 B2
(45) Date of Patent: Jun. 5, 2018

(54) TRANSPORT CONTROL SYSTEM

(71) Applicant: Murata Machinery, Ltd., Kyoto-shi, Kyoto (JP)

(72) Inventors: Kenji Kumagai, Inuyama (JP); Hisato Yoneda, Inuyama (JP)

(73) Assignee: Murata Machinery, Ltd. (JP)

( * ) Notice: Subject to any disclaimer, the term of this patent is extended or adjusted under 35 U.S.C. 154(b) by 139 days.

(21) Appl. No.: 15/123,018

(22) PCT Filed: Jan. 30, 2015

(86) PCT No.: PCT/JP2015/052724
§ 371 (c)(1),
(2) Date: Sep. 1, 2016

(87) PCT Pub. No.: WO2015/146281
PCT Pub. Date: Oct. 1, 2015

(65) Prior Publication Data
US 2017/0082989 A1    Mar. 23, 2017

(30) Foreign Application Priority Data
Mar. 27, 2014 (JP) .................................. 2014-065606

(51) Int. Cl.
*G05B 15/00* (2006.01)
*B65G 43/00* (2006.01)
*G05B 19/418* (2006.01)

(52) U.S. Cl.
CPC ............. *G05B 15/00* (2013.01); *B65G 43/00* (2013.01); *G05B 19/41865* (2013.01);
(Continued)

(58) Field of Classification Search
CPC combination set(s) only.
See application file for complete search history.

(56) References Cited

U.S. PATENT DOCUMENTS 5,984,498 A * 11/1999 Lem .................... G05B 19/0421
700/112
6,134,482 A * 10/2000 Iwasaki ............ G05B 19/41865
414/14

(Continued)

FOREIGN PATENT DOCUMENTS

JP    H09179742 A    7/1997
JP    2001-290637 A  10/2001

(Continued)

OTHER PUBLICATIONS

English language translation of International Search Report dated Apr. 7, 2015 issued in corresponding PCT application PCT/JP2015/052724.

(Continued)

*Primary Examiner* — Kyle O Logan
(74) *Attorney, Agent, or Firm* — DLA Piper LLP (US)

(57) ABSTRACT

A transport control system divides a series of data-processing operations into mutually independent processes, and causes the process execution units to execute the respective processes. The data input or output by each process execution unit is stored in the data storage separate from the process execution unit, and transfer of the data between the respective process execution units is performed via the data storage instead of being performed directly between the process execution units. By separating the processes from each other and also separating the processes from the data in this manner, without affecting process execution units other than a process execution unit to be changed and the data storage, the process execution unit to be changed can be changed to a different process execution unit.

7 Claims, 12 Drawing Sheets

(52) U.S. Cl.
CPC .... *G06F 8/656* (2018.02); *G05B 2219/13153* (2013.01); *G05B 2219/31276* (2013.01); *Y02P 90/20* (2015.11); *Y02P 90/28* (2015.11)

(56) References Cited

U.S. PATENT DOCUMENTS

| | | | | |
|---|---|---|---|---|
| 2004/0111339 | A1* | 6/2004 | Wehrung | G06Q 10/02 |
| | | | | 705/30 |
| 2006/0044420 | A1 | 3/2006 | Iguchi et al. | |
| 2007/0166030 | A1* | 7/2007 | Lee | G05B 19/41865 |
| | | | | 396/611 |
| 2014/0358271 | A1* | 12/2014 | Asakawa | G05B 19/41865 |
| | | | | 700/112 |
| 2015/0068871 | A1* | 3/2015 | Tachibana | B65G 43/00 |
| | | | | 198/502.1 |

FOREIGN PATENT DOCUMENTS

| | | |
|---|---|---|
| JP | 2006-197548 A | 7/2006 |
| JP | 2009-187099 A | 8/2009 |
| JP | 2010-262588 A | 11/2010 |
| JP | 2012-206787 A | 10/2012 |

OTHER PUBLICATIONS

International Preliminary Report on patentability (Chapter I or Chapter II) dated Oct. 13, 2016 issued in corresponding PCT application PCT/JP2015/052724.

* cited by examiner

TRANSPORT CONTROL SYSTEM

CROSS REFERENCE TO RELATED APPLICATIONS

This application is a national stage of international application no. PCT/JP2015/052724, filed on Jan. 30, 2015, and claims the benefit of priority under 35 USC 119 of Japanese application no. 2014-065606, filed on Mar. 27, 2014, both of which are incorporated herein by reference in their entirety.

TECHNICAL FIELD

An aspect of the present invention relates to a transport control system configured to control transport of articles.

BACKGROUND ART

Patent Literature 1 below describes, as a computer system (hereinafter referred to as "transport control system") configured to control transport of articles in a factory, for example, a system configured to control transport of semiconductors in a semiconductor production line. The transport amount of semiconductors required in a factory producing semiconductors has been increasing recently, which makes it difficult to stop operation of the factory for a long period of time.

CITATION LIST

Patent Literature

[Patent Literature 1] Japanese Unexamined Patent Publication No. 2010-262588

SUMMARY OF INVENTION

Technical Problem

In view of the increasing transport amount of articles required, it is predicted that the necessity of flexibly changing (updating or rollbacking) a program of the transport control system will become greater in order to further improve efficiency of transport control of articles. When a program of a transport control system is changed, it is necessary to partially introduce a new function and verify the function. In this case, stopping the entire transport control system when changing part of the program of the transport control system will exert a significant influence on the factory production. In order to reduce such an influence on the factory production within an acceptable range, if the frequency of updating the program of the transport control system is reduced, a request to appropriately improve the transport control system cannot be quickly responded to.

In view of this, a transport control system that can prevent the entire system from being stopped due to partial program change is desired.

Solution to Problem

A transport control system according to one aspect of the present invention is a transport control system configured to perform a series of data-processing operations for controlling transport of an article, and includes: a plurality of process execution units configured to execute a plurality of mutually independent processes constituting the data-processing operations; and at least one data storage configured to store therein a plurality of pieces of data input or output by the process execution units. A first process execution unit out of the process execution units inputs data as a target of the data-processing operations, executes a predetermined process using the data, and outputs data obtained by executing this process to the data storage. Each process execution unit between the first process execution unit and a last process execution unit out of the process execution units inputs data that is output to the data storage by a process execution unit immediately preceding this process execution unit, executes a predetermined process using the data, and outputs data obtained by executing this process to the data storage. The last process execution unit out of the process execution units inputs data that is output to the data storage by a process execution unit immediately preceding this process execution unit, executes a predetermined process using the data, and outputs data obtained by executing this process as a processing result.

The above-described transport control system divides the series of data-processing operations into the mutually independent processes, and causes the process execution units to execute the respective processes. The data input or output by each process execution unit is stored in the data storage separate from the process execution unit, and transfer of the data between the respective process execution units is performed via the data storage instead of being performed directly between the process execution units. By separating the processes from each other and also separating the processes from the data in this manner, without affecting process execution units other than a process execution unit to be changed and the data storage, the process execution unit to be changed can be changed to a different process execution unit. Thus, the above-described transport control system can prevent the entire system from being stopped due to partial program change. In particular, when the articles to be transported are semiconductors, short-term demand therefor varies frequently, and thus it is preferable to use a program that can respond to a transport amount suitable to meet the demand. In the above-described transport control system, even if a program is changed in one transport control subsystem (process execution unit), other transport control subsystems at the previous and the next steps can continue their processes without considering the program change of the one transport control subsystem. Even if a security vulnerability is found with high frequency in the transport control system, without the need of stopping the other transport control subsystems, a security program of the one transport control subsystem can be quickly updated.

The above-described transport control system may further include: a reception-process execution unit configured to operate independently of the process execution units and the data storage to receive data as a target of the data-processing operations from outside; and a reception data storage configured to operate independently of the process execution units and the data storage to store therein the data received by the reception-process execution unit. The first process execution unit out of the process execution units may input the data stored in the reception data storage.

In the above-described transport control system, the reception-process execution unit and the reception data storage that operate independently of the process execution units and the data storage function as an input interface from outside, regardless of whether the process execution units and the data storage are operating. Thus, even if operation of the process execution units or the data storage is stopped by a changing operation of the process execution units or the data storage, for example, data can be continuously received from outside.

The above-described transport control system may further include: a transmission data storage configured to operate independently of the process execution units and the data storage to store therein data output as the processing result by the last process execution unit out of the process execution units; and a transmission-process execution unit configured to operate independently of the process execution units and the data storage to transmit the data stored in the transmission data storage to the outside. The last process execution unit out of the process execution units may output the data output as the processing result to the transmission data storage.

In the above-described transport control system, the transmission-process execution unit and the transmission data storage that operate independently of the process execution units and the data storage function as an output interface to the outside, regardless of whether the process execution units and the data storage are operating. Thus, even if the process execution units or the data storage is stopped by a changing operation of the process execution units or the data storage, for example, data can be continuously transmitted to the outside as long as the data is stored in the transmission data storage.

The above-described transport control system may further include a process change unit configured to change a certain process execution unit out of the process execution units to a different process execution unit. The process change unit may include: an information input unit configured to input information for identifying a pre-change process execution unit to be changed out of the process execution units and information for identifying a post-change process execution unit with which the pre-change process execution unit is to be replaced; a process generation unit configured to generate the post-change process execution unit; a process stop unit configured to determine whether the pre-change process execution unit is executing the corresponding process, and to put the pre-change process execution unit into a stop state of being unable to execute the process when it is determined that the pre-change process execution unit is not executing the process; and a process start unit configured to put the post-change process execution unit into a start state of being able to execute the process after the pre-change process execution unit is put into the stop state by the process stop unit.

In the above-described transport control system, the process change unit generates the post-change process execution unit. Subsequently, the process change unit, after determining that the pre-change process execution unit is not executing a process, stops the pre-change process execution unit and puts the post-change process execution unit into the state of being able to execute the process. By the processes described above, a data inconsistency due to replacement of the process execution units can be prevented, and also without affecting process execution units other than a process execution unit related to a change and the data storage, the pre-change process execution unit can be replaced with the post-change process execution unit. Thus, the above-described transport control system can prevent the entire system from being stopped due to partial program change.

In the above-described transport control system, regardless of whether the process change unit is changing a certain process execution unit to a different process execution unit, each process execution unit preceding the certain process execution unit may execute the corresponding process.

In the above-described transport control system, transfer of data between the process execution units is performed via the data storage, and is not performed directly between the process execution units. Thus, even when the process change unit is executing a change process on a certain process execution unit, each process execution unit preceding this certain process execution unit can continue to execute the corresponding process without being affected by the change of the certain process execution unit. Consequently, with the above-described transport control system, even when a certain process execution unit is being changed, processing performed by each process execution unit preceding the certain process execution unit can be continued, whereby the entire system can be prevented from being stopped.

In the above-described transport control system, regardless of whether the process change unit is changing a certain process execution unit to a different process execution unit, each process execution unit following the certain process execution unit may execute the corresponding process when data output by the certain process execution unit is stored in the data storage.

In the above-described transport control system, even when a change process is being executed on a certain process execution unit by the process change unit, each process execution unit following the certain process execution unit can execute the corresponding process if input data is stored in the data storage. Thus, with the above-described transport control system, even when a certain process execution unit is being changed, processing performed by each process execution unit following the certain process execution unit can be continued, whereby the entire system can be prevented from being stopped.

The above-described transport control system may further include a data change unit configured to change the data storage to a different data storage. The data change unit may include: an information input unit configured to input information for identifying a post-change data storage with which the data storage is to be replaced, information for identifying a pre-change process execution unit to be changed out of the process execution units, and information for identifying a post-change process execution unit with which the pre-change process execution unit is to be replaced; a process generation unit configured to generate the post-change data storage and the post-change process execution unit; a process stop unit configured to determine whether the pre-change process execution unit is executing the corresponding process, and to put the pre-change process execution unit into a stop state of being unable to execute the process when it is determined that the pre-change process execution unit is not executing the process; a data transfer unit configured to transfer the data stored in the data storage to the post-change data storage after the pre-change process execution unit is put into the stop state by the process stop unit; and a process start unit configured to put the post-change process execution unit into a start state of being able to execute the process after the data is transferred by the data transfer unit.

In the above-described transport control system, the data change unit generates the post-change data storage, and generates the post-change process execution unit. Subsequently, the data change unit, after stopping the pre-change process execution unit, transfers the data from the pre-change data storage to the post-change data storage by the data transfer unit, and then starts the post-change process execution unit. By the processes described above, replacement of both of the process execution units and the data storages can be performed reliably and easily by using a pre-established procedure. Thus, the above-described transport control system can prevent the entire system from being stopped for a long period of time due to partial program change.

Advantageous Effects of Invention

According to one aspect of the present invention, it is possible to provide a transport control system that can prevent the entire system from being stopped due to partial program change.

DESCRIPTION OF EMBODIMENTS

An embodiment of the present invention will now be described in detail with reference to the attached drawings. In the description of the drawings, like reference signs are given to like or equivalent elements, and duplicated explanation is omitted.

Figure 1:
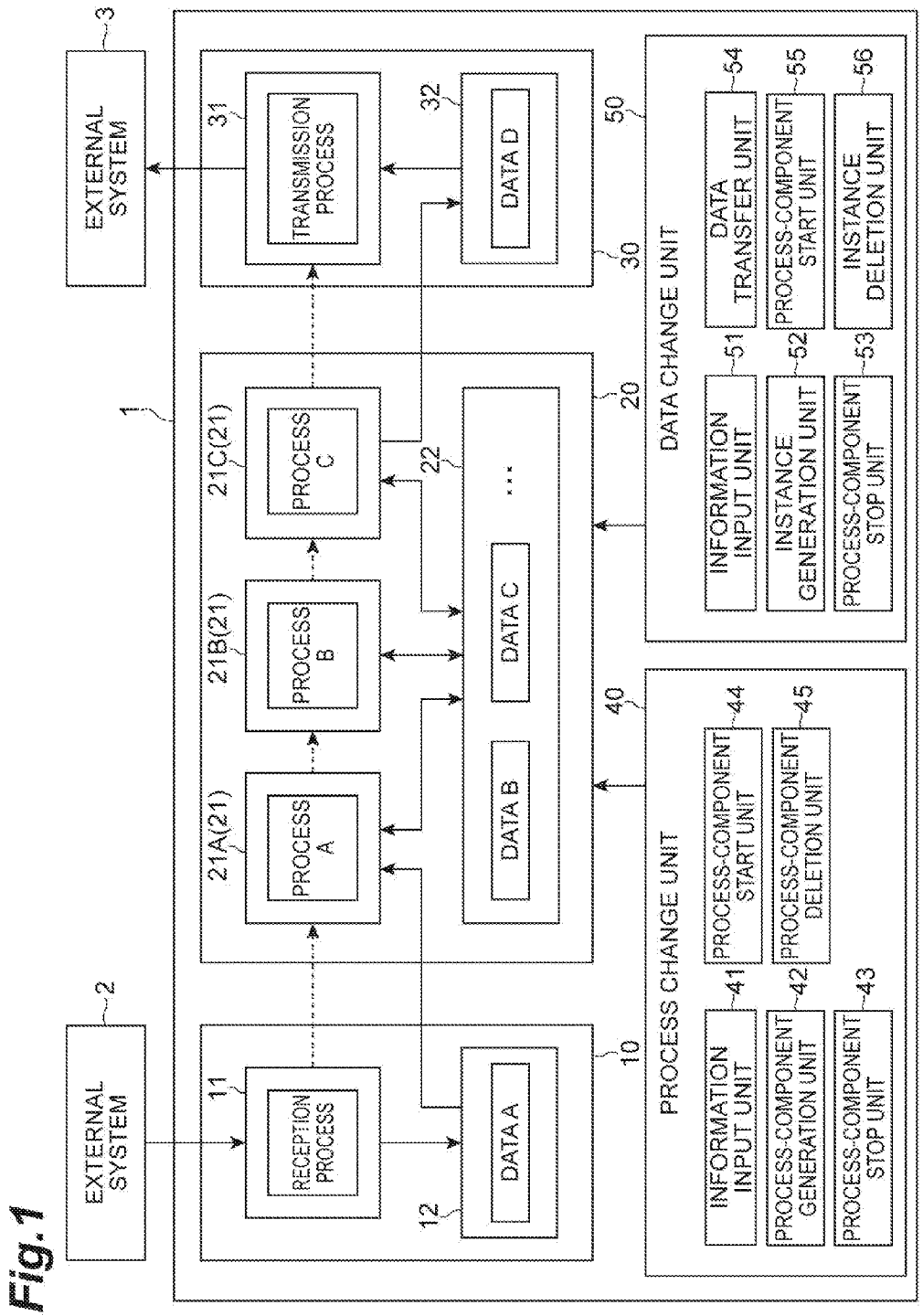
FIG. 1 is a block diagram illustrating a functional configuration of a transport control system according to one embodiment of the present invention.

A transport control system 1 according to the present embodiment depicted in FIG. 1 is, for example, a computer system configured to execute data-processing operations for controlling transport of articles such as semiconductors. As depicted in FIG. 1, the transport control system 1 includes a reception interface 10, a control application 20, a transmission interface 30, a process change unit 40, and a data change unit 50. The reception interface 10, the control application 20, the transmission interface 30, the process change unit 40, and the data change unit 50 are implemented as a program created by using an object-oriented programming language such as C#. In this program created by using an object-oriented programming language, a CPU 101 described later generates, on a RAM 102 described later, objects (instances) each of which can execute a specific process on the basis of a class (model) describing data structures and behaviors (processes). These instances generated on the RAM 102 execute processes in a manner cooperating with each other. In the following description, simply using the expression "generate" means to generate an instance on the RAM 102 on the basis of the class.

The transport control system 1 receives data from an external system 2 via the reception interface 10. The control application 20 inputs the data received by the reception interface 10 to execute predetermined arithmetic processing and data processing, for example. The transmission interface 30 transmits a processing result (e.g., an arithmetic result and processed data) obtained by the control application 20 to an external system 3. The external system 2 and the external system 3 may be a computer system that is separate from the transport control system 1, or may be an operator who uses the transport control system 1 via an input device 104 and an output device 105 described later, for example. When the external system 2 is such an operator, the reception interface 10 acquires data input by the operator via the input device 104 such as a keyboard. When the external system 3 is such an operator, the transmission interface 30 displays data to the operator via the output device 105 such as a display. The external system 2 and the external system 3 may be identical.

Figure 2:
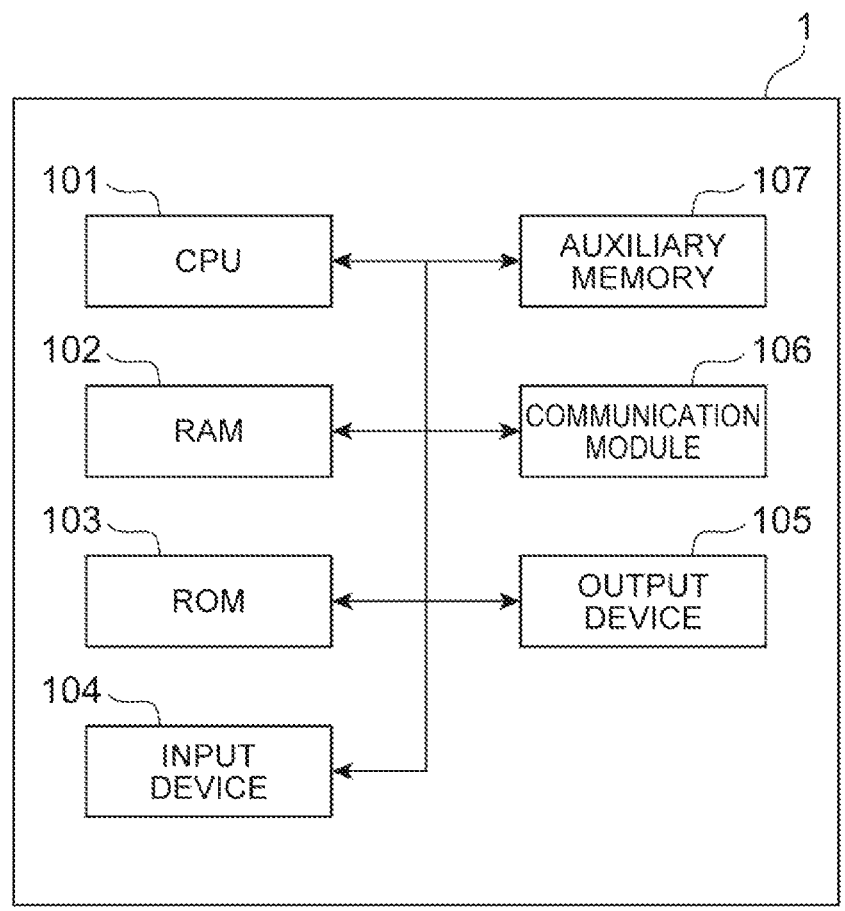
FIG. 2 is a block diagram illustrating one example of a hardware configuration of the transport control system.

As depicted in FIG. 2, as a hardware configuration, the transport control system 1 is configured as a computer system including the CPU 101 provided one or more, the RAM 102 provided one or more and at least one ROM 103 that are main memories, the input device 104 such as a keyboard, the output device 105 such as a display, a communication module 106 for performing wire communication or wireless communication with outside, and an auxiliary memory 107 such as a hard disk drive and a semiconductor memory.

Each function of the reception interface 10, the control application 20, the transmission interface 30, the process change unit 40, and the data change unit 50 of the transport control system 1 is implemented by reading a predetermined program on hardware of the CPU 101 and the RAM 102 depicted in FIG. 2, for example, thereby causing the input device 104 and the output device 105 to operate and also causing the communication module 106 to operate under the control of the CPU 101, and reading and writing data in the RAM 102 and the auxiliary memory 107.

The reception interface 10 is an interface configured to receive data from the external system 2, and operates independently of the control application 20. The reception interface 10 includes a reception-process component (reception-process execution unit) 11 and a reception data store (reception data storage) 12. The reception-process component 11 executes a process of receiving data input by the external system 2. When having received data to be used for processes in the control application 20 from the external system 2, the reception-process component 11 stores the received data (hereinafter referred to as "data A") in the reception data store 12. The reception-process component 11 may receive instruction information on change of a process component 21 described later or change of a data store 22 described later, for example, from the external system 2. In this case, the reception-process component 11 notifies the process change unit 40 or the data change unit 50 described later of the instruction information. The reception-process component 11 may, as a process of reception processing, output information indicating successful completion or failure of data reception from the external system 2 as a response message to the external system 2.

The reception data store 12 is configured as a queue, for example, and stores therein data received by the reception-process component 11. The data (data A) stored in the reception data store 12 is data to be input into a process component 21A configured to execute the first process A out of a plurality of the process components 21 that are included in the control application 20 described later. The reception-process component 11 and the reception data store 12 may be configured to receive and store therein one type of data (data A) as described above and, alternatively, may be configured to receive and store therein a plurality of types of data.

The control application 20 is a portion that executes specific data-processing operations (e.g., arithmetic processing or data processing) for controlling transport of articles, and includes a plurality of the process components (process execution units) 21 (21A, 21B, and 21C) (herein, three as one example) and the data store (data storage) 22. In the present embodiment, as one example, the process components 21A, 21B, 21C are disposed in series so as to sequentially execute each of a plurality of mutually independent processes constituting a series of data-processing operations, and execute the process A, a process B, and a process C, respectively. The data store 22 is a data storage that is configured as a queue that accumulates a plurality of pieces of data for each type, for example, and stores therein a plurality of pieces of data input or output by the respective process components 21. The respective process components 21 can access the data store 22 by an instance configuration described later.

Figure 3:
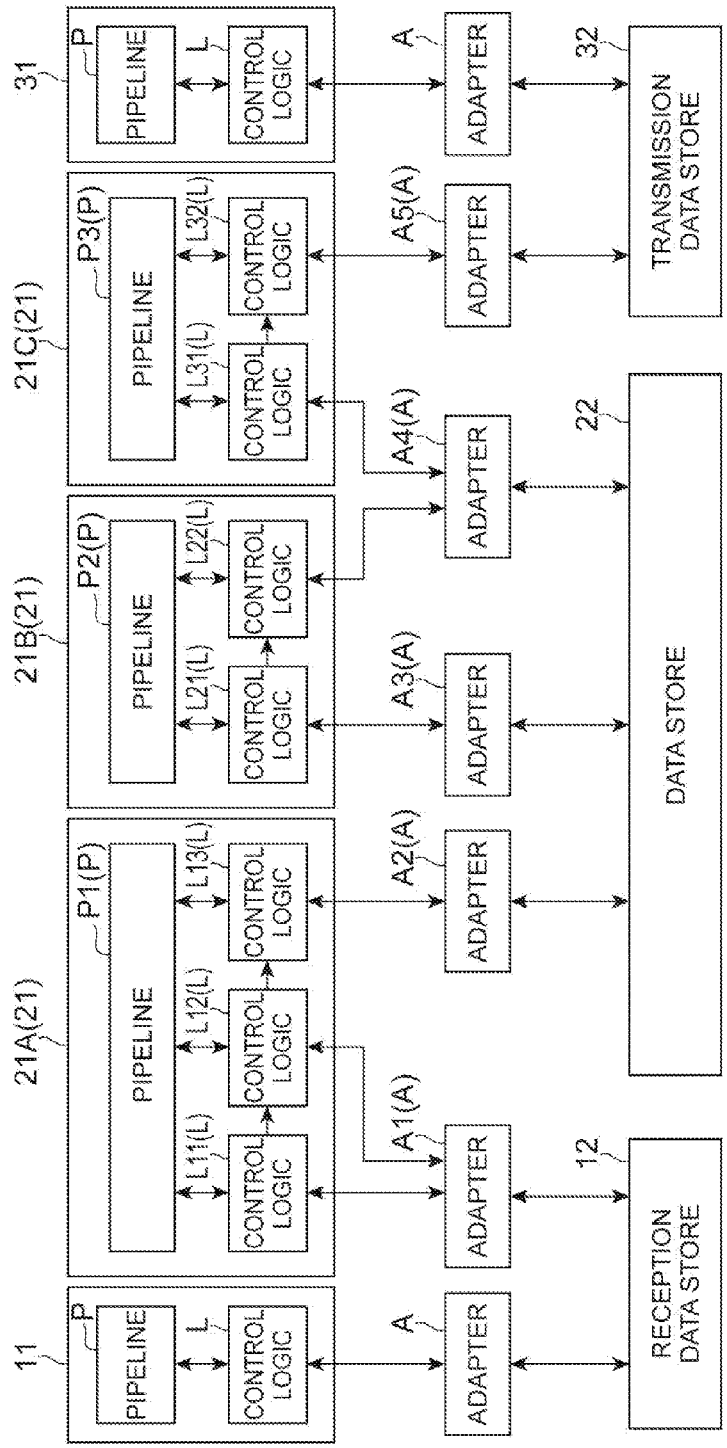
FIG. 3 is a block diagram conceptually illustrating an instance configuration of the transport control system.

FIG. 3 conceptually illustrates the instance configuration of the process components 21 and the data store 22. It should be noted that the instance configuration illustrated in FIG. 3 is merely one example. As depicted in FIG. 3, each process component 21 is configured with control logics L that are one or more (herein, two or three as one example) instances for executing predetermined processes (e.g., arithmetic processing and data processing) using data stored in the data store 22 and a pipeline P that is an instance for managing execution of the control logics L. Herein, one example in which data store 22 is single is described, but a plurality of the data stores 22 may be employed depending on types of stored data, for example.

By configuring each process component 21 in a manner divided into the pipeline P and the one or more control logics L as described above, the corresponding process (the process A, the process B, or the process C) executed by the process component 21 can be divided into smaller units of processes. Dividing the processes in this manner facilitates commonality of processes of the control logics L between the process components 21, thereby making it possible to increase the reusability of classes (programs) of the existing control logics L. Specifically, among the process components 21, control logics L that execute a common process can be generated from a common class, which can reduce types of classes of the control logics L required in the entire control application 20, thereby enabling reduction in burden of program development.

In the present embodiment, the above-described data store 22 is an instance for providing a data access function to the control logics L via adapters A described later. The data store 22 may store therein, for example, an instance (not depicted) of a wrapper class that is described so as to absorb differences in, for example, storing format of actually used data to enable data access in a common manner, as data to be transferred between the control logics L and the adapters A.

The control logics L are each associated with the adapters A, and the adapters A are associated with the data store 22. In this manner, the control logics L are configured to indirectly access the data store 22 via the adapters A. This can prohibit unlimited access to data stored in the data store 22 from the control logics L. Specifically, the adapters A are instances that provide, to each control logic L, minimum required access (e.g., read only) to data needed for the corresponding process of the control logic L out of pieces of data stored in the data store 22. This can reduce burdens of monitoring whether unpermitted access is made to data stored in the data store 22 from the control logics L and whether the data is tampered. As depicted in FIG. 3, the adapters A may be shared when the contents of permitted data access are the same between mutually different control logics L.

Each pipeline P has a "start state", a "stop state", and a "stop-transitional state" as a state (executable state) indicating whether the corresponding processes can be executed. The pipeline P stores therein an executable flag indicating which of the above-described states the executable state of the pipeline P is. The "start state" indicates a state in which the pipeline P is allowed to cause the corresponding control logics L to execute the processes. In other words, the "start state" indicates a state in which the corresponding process component 21 can execute the processes. The "stop state" indicates a state in which the pipeline P is not allowed to cause the control logics L to execute the processes. In other words, the "stop state" indicates a state in which the process component 21 cannot execute the processes. The "stop-transitional state" indicates a state of a previous stage before the pipeline P transitions from the "start state" to the "stop state". More specifically, the "stop-transitional state" indicates a state in which a process that has already started to be executed can continue to be executed, but a process that has not yet started to be executed cannot start to be newly executed. In other words, the "stop-transitional state" is a state of waiting for completion of the process that has already started to be executed.

Each pipeline P has an "executing state" and a "non-execution state" as a state (execution state) indicating whether the corresponding processes are being executed. The pipeline P stores therein an execution flag indicating which of the above-described states the execution state of the pipeline P is. The "executing state" indicates a state in which one or more control logics L out of the control logics L managed by the pipeline P are executing the corresponding processes. In other words, the "executing state" indicates a state in which the corresponding process component 21 is executing the processes. The "non-execution state" indicates a state in which none of the control logics L managed by the pipeline P is executing the corresponding process. In other words, the "non-execution state" indicates a state in which the process component 21 is not executing the processes.

The pipeline P is in the stop state and in the non-execution state at the time of being generated. The pipeline P transitions from the stop state to the start state when having received an external stimulus (e.g., an explicit request from the external system 2 such as an operator, or a trigger by a timer or other devices). Operations of the pipeline P and the control logics L are limited by the executable state and the execution state of the pipeline P. The pipeline P can transition from the non-execution state to the executing state only when being in the start state. In other words, only when the pipeline P is in the start state, the control logics L managed by the pipeline P can execute the processes. Furthermore, only when the pipeline P is in the non-execution state, the pipeline P can transition to the stop state. Mechanism of such operations of the pipeline P and the control logics L can be implemented by, for example, referring to the executable flag and the execution flag of the pipeline P and determining whether the certain operation can be executed based on the states of the flags before the pipeline P and the control logics L execute a certain operation (e.g., stop, execution of a predetermined process).

As depicted in FIG. 3, the reception-process component 11 and a transmission-process component 31 described later also may have instance configurations similar to that of the process component 21. In the illustration of FIG. 3, the number of control logics L in each of the reception-process component 11 and the transmission-process component 31 is one, but each of the reception-process component 11 and the transmission-process component 31 may have two or more control logics L.

The following describes a procedure by which the control application 20 executes a series of data-processing operations with reference to FIG. 1 and FIG. 3.

To begin with, the process component 21A configured to perform the first process A inputs the data A accumulated in the reception data store 12 as data to be data processed, and executes the process A using the data A. The process component 21A outputs data (hereinafter referred to as "data B") obtained by executing the process A to the data store 22. Thus, the data B is stored in the data store 22.

The above-described process by the process component 21A is performed, for example, as follows. The first control logic L11 periodically monitors the reception data store 12 when the executable flag of the pipeline P1 indicates the start state. The control logic L11 notifies the control logic L12 when having detected that the received data (data A) is stored in the reception data store 12. The control logic L12 notified by the control logic L11 acquires the data A from the reception data store 12 via the adapter A1, and executes the predetermined processes (e.g., arithmetic processing and data processing) using the data A. The control logic L12 outputs the processed data to the control logic L13. The control logic L13 outputs the data (data B) acquired from the control logic L12 to the data store 22 via the adapter A2.

Subsequently, the process component 21B configured to execute the second process B out of the series of data-processing operations inputs the data B output to the data store 22 by the process component 21A immediately preceding the process component 21B, and executes the process B using the data B. The process component 21B outputs data (hereinafter referred to as "data C") obtained by executing the process B to the data store 22. Thus, the data C is accumulated in the data store 22.

The above-described process by the process component 21B is performed, for example, as follows. When the executable flag of the pipeline P2 indicates the "start state", the first control logic L21 periodically monitors the data store 22 via the adapter A3. When having detected that data (data B) to be processed is stored in the data store 22, the control logic L21 acquires the data B from the data store 22. The control logic L21 executes the predetermined processes using the acquired data B. The control logic L21 outputs data obtained by executing the predetermined processes to the control logic L22. The control logic L22 outputs the data C acquired from the control logic L21 to the data store 22 via the adapter A4.

Subsequently, the process component 21C configured to execute the last process C inputs the data C output to the data store 22 by the immediately preceding process component 21B, and executes the process C using the data C. The process component 21C outputs data (hereinafter referred to as "data D") obtained by executing the process C as a processing result of the series of data-processing operations to the transmission data store 32. Thus, the data D to be transmitted to the external system 3 is accumulated in the transmission data store 32.

The above-described process by the process component 21C is performed, for example, as follows. When the executable flag of the pipeline P3 indicates the "start state", the first control logic L31 periodically monitors the data store 22 via the adapter A4. When having detected that data (data C) to be processed is stored in the data store 22, the control logic L31 acquires the data C from the data store 22. The control logic L31 executes the predetermined processes using the acquired data C. The control logic L31 outputs data obtained by executing the predetermined processes to the control logic L32. The control logic L32 outputs the data D acquired from the control logic L31 to the transmission data store 32 via the adapter A5.

The transmission interface 30 is an interface configured to transmit data to the external system 3, and operates independently of the control application 20. The transmission interface 30 includes a transmission-process component (transmission-process execution unit) 31 and a transmission data store (transmission data storage) 32. The transmission data store 32 is configured as a queue, for example, and accumulates therein the data D as described above. The data D is data that is output as a processing result of the series of data-processing operations by the process component 21C configured to execute the last process C out of the process components 21. The transmission-process component 31 executes a process of transmitting the data D accumulated in the transmission data store 32 to the external system 3.

The timing when the transmission-process component 31 transmits the data D to the external system 3 can be optionally determined. For example, the transmission-process component 31 may periodically determine whether predetermined transmission time has been reached with a timer that can be referred to. If determining that the transmission time has been reached, the transmission-process component 31 may acquire the data D from the transmission data store 32 to transmit the acquired data D to the external system 3. When receiving a data transmission request from the external system 3 by some method, the transmission-process component 31 may acquire the data D from the transmission data store 32 to transmit the acquired data D to the external system 3. When the data D is not stored in the transmission data store 32, the transmission-process component 31 may transmit a message indicating that no transmission data is stored to the external system 3. Note that the transmission data store 32 and the transmission-process component 31 may be configured to store and transmit one type of data (data D) as described above, or alternatively may be configured to store and transmit a plurality of types of data.

The above-described reception process by the reception interface 10 does not depend on the processes of the control application 20. Specifically, the reception-process component 11 accumulates data received from the external system 2 in the reception data store 12 that is independent of the data store 22, and does not directly transfer the data to the control application 20 (the process components 21 or the data store 22). This enables the reception interface 10 to operate as a thread (or a process) separate from the control application 20. In this case, the process of data reception from the external system 2 by the reception interface 10 can be executed in parallel with process execution by the control application 20. Even if the control application 20 is suspending its operation, the reception interface 10 can be caused to operate, and communication (e.g., data reception) with the external system 2 can be continued.

The transmission process by the transmission interface 30 also does not depend on the processes of the control application 20. Specifically, the transmission-process component 31 acquires data accumulated in the transmission data store 32 that is independent of the data store 22 as data to be transmitted to the external system 3, and does not directly receive the data from the control application 20 (the process components 21 or the data store 22). This enables the transmission interface 30 to operate as a thread (or a process) separate from the control application 20. In this case, the process of data transmission to the external system 3 by the transmission interface 30 can be executed in parallel with process execution by the control application 20. Even if the control application 20 is suspending its operation, the transmission interface 30 can be caused to operate, and communication (e.g., data transmission) with the external system 4 can be continued.

As described above, the transport control system 1 divides the series of data-processing operations into the mutually independent processes, and causes the process components 21 disposed in series to execute the respective processes. The data input or output by each process component 21 is stored in the data store 22 separate from the process component 21, and transfer of the data between the respective process components 21 is performed via the data store 22 instead of being performed directly between the process components 21. By separating the processes from each other and also separating the processes from the data in this manner, when a certain process component 21 is changed to a different process component by the process change unit 40 described later, without affecting the process components 21 other than the process component 21 to be changed and the data store 22, the process component 21 to be changed can be changed to a different process component. Thus, the transport control system 1 can prevent the entire system from being stopped due to partial program change.

The following describes a configuration for changing contents of data-processing operations executed in the control application 20. In the transport control system 1, a certain process component 21 is replaced by the process change unit 40, whereby a process corresponding thereto in the control application 20 is changed.

The process change unit 40 is a process change unit configured to change a certain process component (e.g., the process component 21B) out of the process components 21 to a different process component. The process change unit 40 includes an information input unit 41, a process-component generation unit (process generation unit) 42, a process-component stop unit (process stop unit) 43, a process-component start unit (process start unit) 44, and a process component deletion unit 45.

Figure 5:
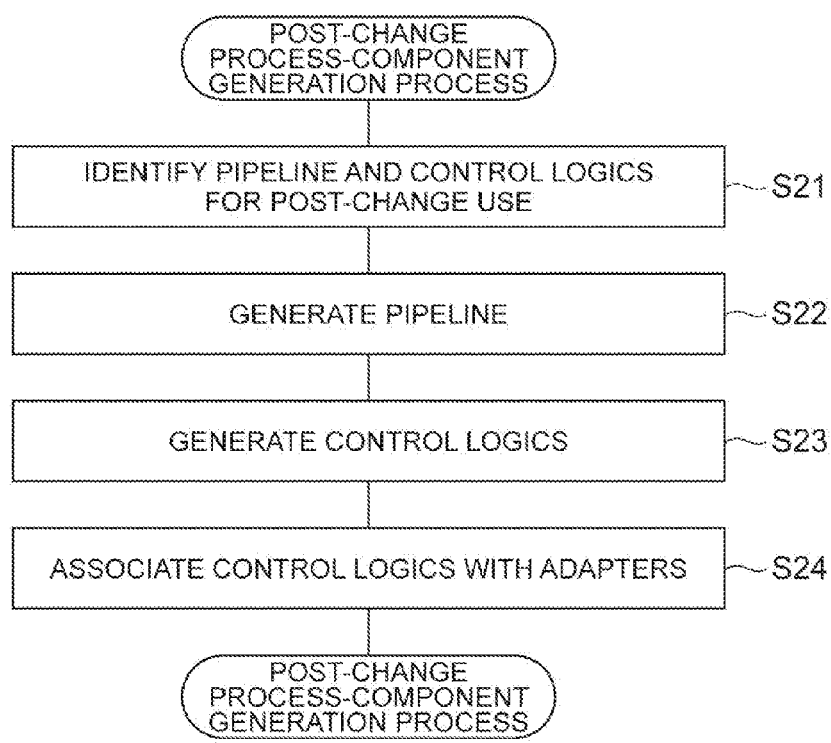
FIG. 5 is a flowchart of a post-change process-component generation process in FIG. 4.
Figure 6:
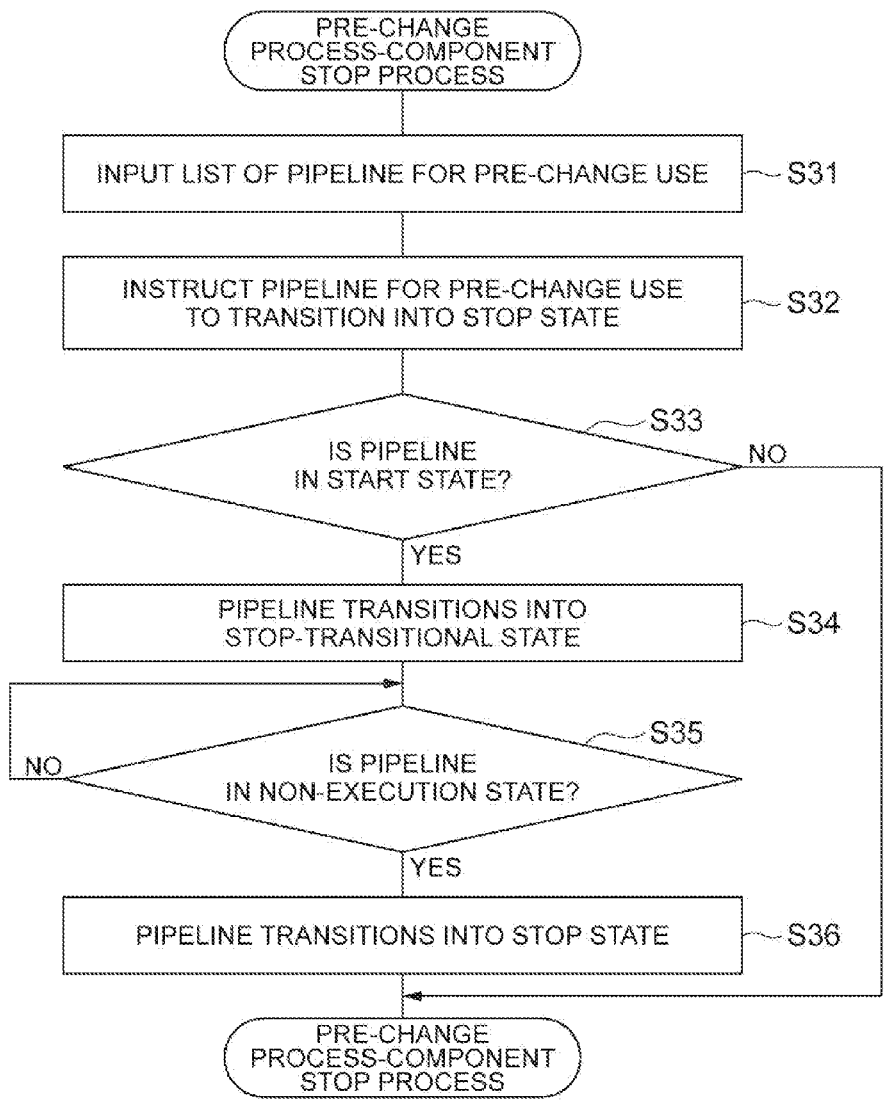
FIG. 6 is a flowchart of a pre-change process-component stop process in FIG. 4.
Figure 7:
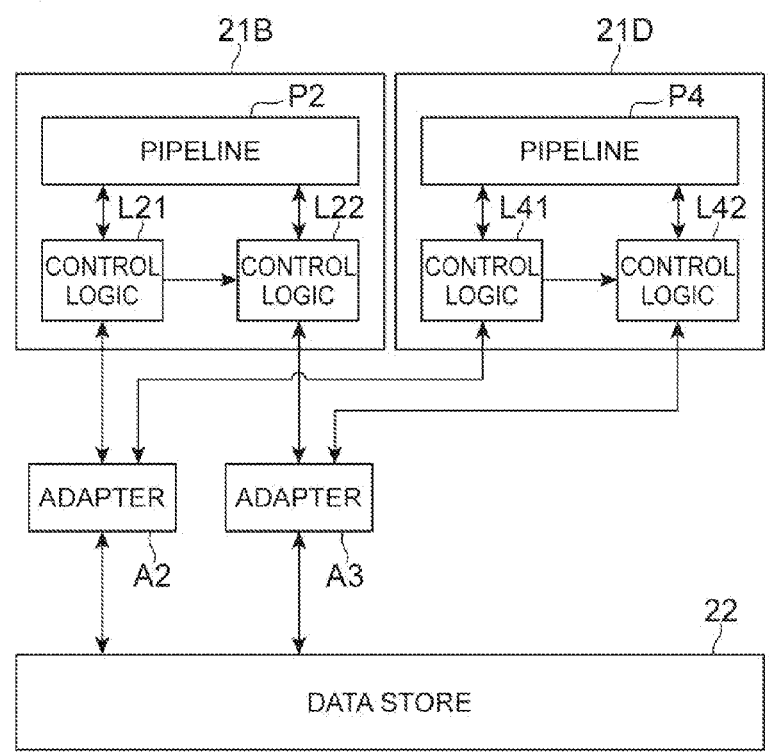
FIG. 7 is a diagram for explaining a state after the post-change process-component generation process in FIG. 4.
Figure 8:
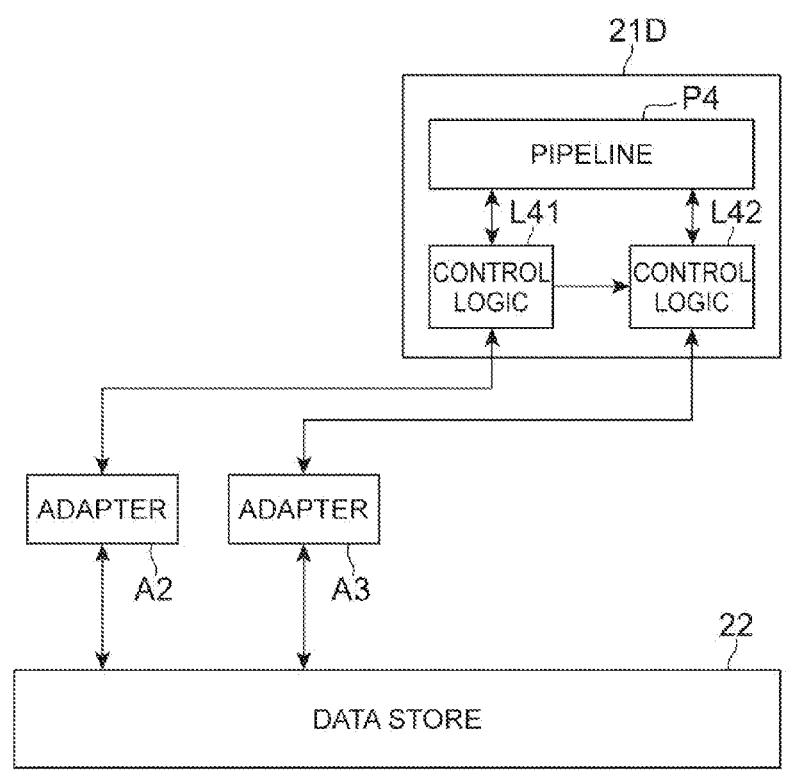
FIG. 8 is a diagram for explaining a state after a pre-change process-component deletion process in FIG. 4.

Referring to FIG. 4 to FIG. 8, details of processes executed by the respective functional elements of the process change unit 40 will be described, and also the process flow of the process change unit 40 will be described. The following describes, as one example, a case in which the process component 21B (pre-change process component) to be changed out of the process components 21 depicted in FIG. 1 is changed to a different process component 21D (post-change process component). As depicted in FIG. 7 and FIG. 8, the process component 21D includes a pipeline P4 and two control logics L41 and L42.

Figure 4:
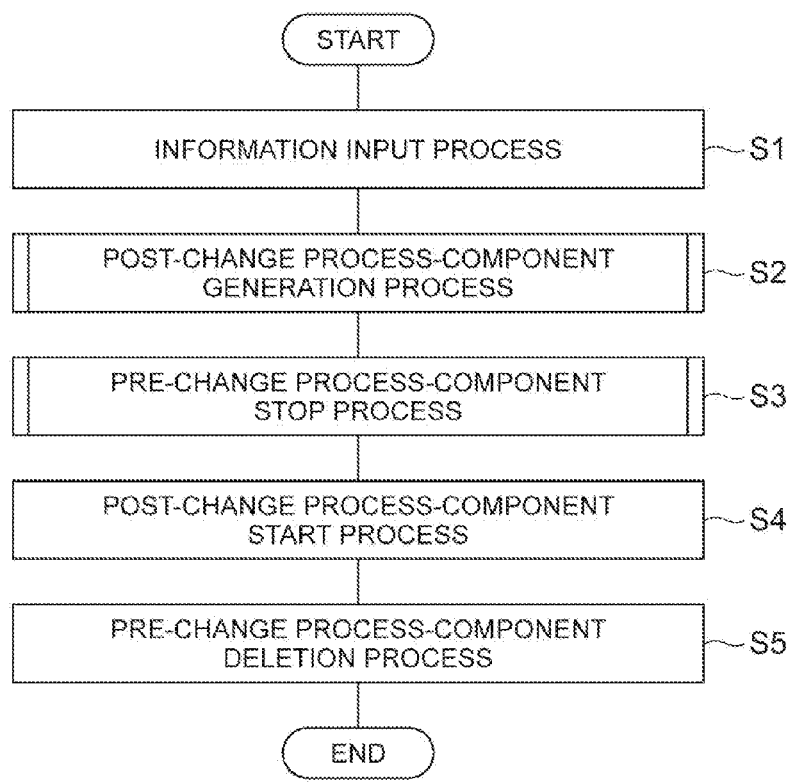
FIG. 4 is a flowchart illustrating operation of the process change unit.

As depicted in FIG. 4, to begin with, an information input process is executed by the information input unit 41 (step S1). The information input process is a process of inputting information for identifying a pre-change process component and information for identifying a post-change process component with which the pre-change process component is to be replaced. The information input unit 41 acquires the information for identifying the pre-change process component and the information for identifying the post-change process component from the operator, for example, (external system 2) via the reception interface 10, for example. Herein, the pre-change process component is the process component 21B, and the post-change process component is the process component 21D. The information for identifying the pre-change process component is information indicating instances (the pipeline P2 and the control logics L21 and L22) constituting the process component 21B. The information for identifying the post-change process component is information indicating instances (the pipeline P4 and the control logics L41 and L42) constituting the process component 21D.

Subsequently, a post-change process-component generation process is executed by the process-component generation unit 42 (step S2). The post-change process-component generation process is a process of generating the process component 21D that is the post-change process component and also connecting the process component 21D to the data store 22 via the adapters A.

FIG. 5 illustrates a specific flowchart of the post-change process-component generation process. As depicted in FIG. 5, the process-component generation unit 42 inputs the information for identifying the post-change process component from the information input unit 41 to identify the pipeline P4 and the control logics L41 and L42 constituting the process component 21D (step S21). Subsequently, the process-component generation unit 42 generates the pipeline P4 identified at step S21 (step S22). Subsequently, the process-component generation unit 42 generates the control logics L41 and L42 identified at step S21, and associates these logics with the pipeline P4 (step S23). Subsequently, the process-component generation unit 42 associates the control logics L41 and L42 with predetermined adapters A (step S24). At this time, the process-component generation unit 42 may associate the control logics L41 and L42 with existing adapters A, or alternatively may associate these logics with a newly generated adapter. Thus, the control logics L41 and L42 are connected to the data store 22 via the adapters A.

FIG. 7 illustrates a state after the post-change process-component generation process has been executed. In this example, the control logic L41 is associated with the adapter A2 associated with the control logic L21, and the control logic L42 is associated with the adapter A3 associated with the control logic L22. This enables the control logic L41 to acquire the data B from the data store 22 via the adapter A2. This also enables the control logic L42 to output data (data corresponding to the data C) to the data store 22 via the adapter A3. However, at this time, the process component 21B is executing its processes, and the process component 21D is suspending its processes. In other words, the pipeline P4 is in the stop state, and the control logics L41 and L42 are in a state of being unable to execute their processes.

Herein, the process-component generation unit 42 may cause the pipeline P4 that manages the control logics L41 and L42 to execute a process of generating the control logics L41 and L42 and a process of associating the control logics L41 and L42 with the predetermined adapters A.

Subsequently, a pre-change process-component stop process is executed by the process-component stop unit 43 (step S3). The pre-change process-component stop process is a process of determining whether the process component 21B that is the pre-change process component is executing the corresponding processes, and putting the process component 21B into the stop state when it is determined that the process component 21B is not executing the processes.

FIG. 6 illustrates a detailed flowchart of the pre-change process-component stop process. As depicted in FIG. 6, the process-component stop unit 43 inputs the information for identifying the pre-change process component from the information input unit 41 to identify the pipeline P2 that is a component of the process component 21B (step S31). Subsequently, the process-component stop unit 43 instructs the pipeline P2 to change the executable state to the stop state (step S32). The pipeline P2 thus instructed refers to the executable flag of its own to determine whether the executable flag indicates the start state (step S33). If the executable flag indicates the stop state (NO at step S33), the pipeline P2 notifies the process-component stop unit 43 of the result (successful completion) and ends the process. If the executable flag indicates the start state (YES at step S33), the pipeline P2 sets the executable flag to the stop-transitional state (step S34). Accordingly, after the control logics L21 and L22 managed by the pipeline P2 have completed the series of processes and the execution state of the pipeline P2 has transitioned to the non-execution state, the control logics L21 and L22 cannot execute the processes again. The pipeline P2 then refers to the execution flag, and if the execution flag indicates the non-execution state (YES at step S35), the pipeline P2 changes the executable flag to the stop state, notifies the process-component stop unit 43 of the result (successful completion), and ends the process (step S36). If the execution flag indicates the executing state (NO at step S35), determination at step S35 is repeatedly executed at predetermined intervals. At the time when it has been determined that the processes of the control logics L21 and L22 have been completed and the execution flag of the pipeline P2 has transitioned to the non-execution state (YES at step S35), the pipeline P2 changes the executable flag to the stop state, notifies the process-component stop unit 43 of the result (successful completion), and ends the process (step S36).

Subsequently, a post-change process-component start process is executed by the process-component start unit 44 (step S4). The post-change process-component start process is a process of putting the process component 21D that is the post-change process component into the start state after the pipeline P2 is put into the stop state by the pre-change process-component stop process (step S3). Specifically, the process-component start unit 44 sets the executable flag of the process component 21D to the start state. Accordingly, the process component 21D transitions to a state of being able to execute the process, and replacement of the process component 21B with the process component 21D is completed. When the data store associated with the process component 21D is different from the data store 22 associated with the other process components 21A to 21C, both of the process component 21B and the process component 21D may be put into the start state. This enables verification of the process component 21D while the process component 21B is being kept in the executing state. If a failure occurs in the process component 21D, stop and deletion of the process component 21D (cancellation of the replacement with the process component 21D) can be easily performed.

After the processes to step S4 have been completed, the process component deletion unit 45 deletes the instances of the process component 21B that have become unnecessary from the RAM 102. For example, the process component deletion unit 45 notifies the pipeline P2 and the control logics L21 and L22 in the process component 21B of a deletion instruction. The pipeline P2 and the control logics L21 and L22 notified of the deletion instruction execute an ending process to be deleted from the RAM 102 (see FIG. 8).

As described above, the process change unit 40 generates the process component 21D that is the post-change process component, and connects the process component 21D to the data store 22 via the adapters A2 and A3. Subsequently, the process change unit 40, after determining that the process component 21B that is the pre-change process component is not executing the processes (that the pipeline P2 is in the non-execution state), stops the process component 21B (puts the pipeline P2 into the stop state), and puts the process component 21D into the start state. This enables the process component 21D to access the data store 22. By the processes described above, a data inconsistency due to replacement of the process components 21B and 21D can be prevented. Without affecting operation of the process components 21A and 21C other than the process component 21B related to the change and the data store 22, the process component 21B can be replaced with the process component 21D. Thus, the transport control system 1 can prevent the entire system from being stopped due to partial program change.

Regardless of whether the process change unit 40 is changing the process component 21B to the different process component 21D, the process component 21A disposed upstream may execute the corresponding processes. This is because transfer of data between the process components 21 is performed via the data store 22, and is not performed directly between the process components 21. Specifically, even when the process change unit 40 is executing a change process on the process component 21B, the process component 21A disposed upstream can continue to execute the corresponding processes without being affected by the change of the process component 21B. Consequently, with the transport control system 1, even when a certain process component 21 is being changed, processing performed by each process component 21 preceding (disposed upstream of) the certain process component 21 can be continued, whereby the entire system can be prevented from being stopped.

Regardless of whether the process change unit 40 is changing the process component 21B to the different process component 21D, the process component 21C disposed downstream may execute the corresponding processes when data (data C) output from the process component 21B is stored in the data store 22. This is because even when the process of changing the process component 21B to the process component 21D is being executed by the process change unit 40, the process component 21C disposed downstream can execute the corresponding processes if input data (data C) is stored in the data store. Thus, with the transport control system 1, even when a certain process component 21 is being changed, processing performed by each process component 21 following (disposed downstream of) the certain process component 21 can be continued, whereby the entire system can be prevented from being stopped.

Configuration in which, during execution by a certain process component 21 related to a change, the other process components 21 execute the corresponding processes can be made by, for example, assigning a different thread to each process component 21 and causing the process components 21 to execute the corresponding threads in parallel.

The data change unit 50 is a data change unit configured to change the data store 22 to a different data store 23. For example, it is assumed herein that the processes of the process components 21A, 21B, and 21C are changed, and the process components 21 are required to process data that can handle a new format in data definition stored in the data store 22. In this case, the data change unit 50 changes the existing data store 22 to the data store 23 storing therein the data that can handle the new format, while maintaining the data consistency. Herein, in order that the new and old process components 21 can use the data stored in the data store 23 for post-change use, the adapters A may absorb differences in data format. The data change unit 50 includes an information input unit 51, an instance generation unit (process generation unit) 52, a process-component stop unit (process stop unit) 53, a data transfer unit 54, a process-component start unit (process start unit) 55, and an instance deletion unit 56.

Figure 9:
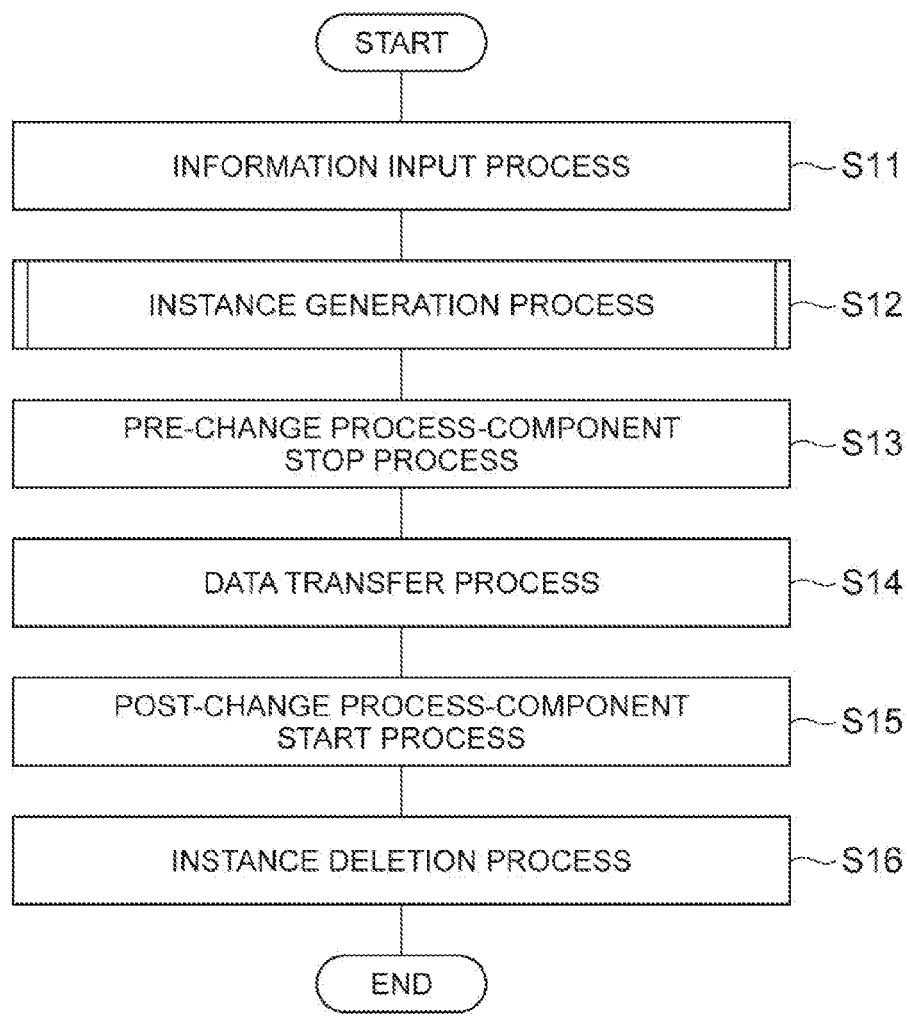
FIG. 9 is a flowchart illustrating operation of a data change unit.
Figure 10:
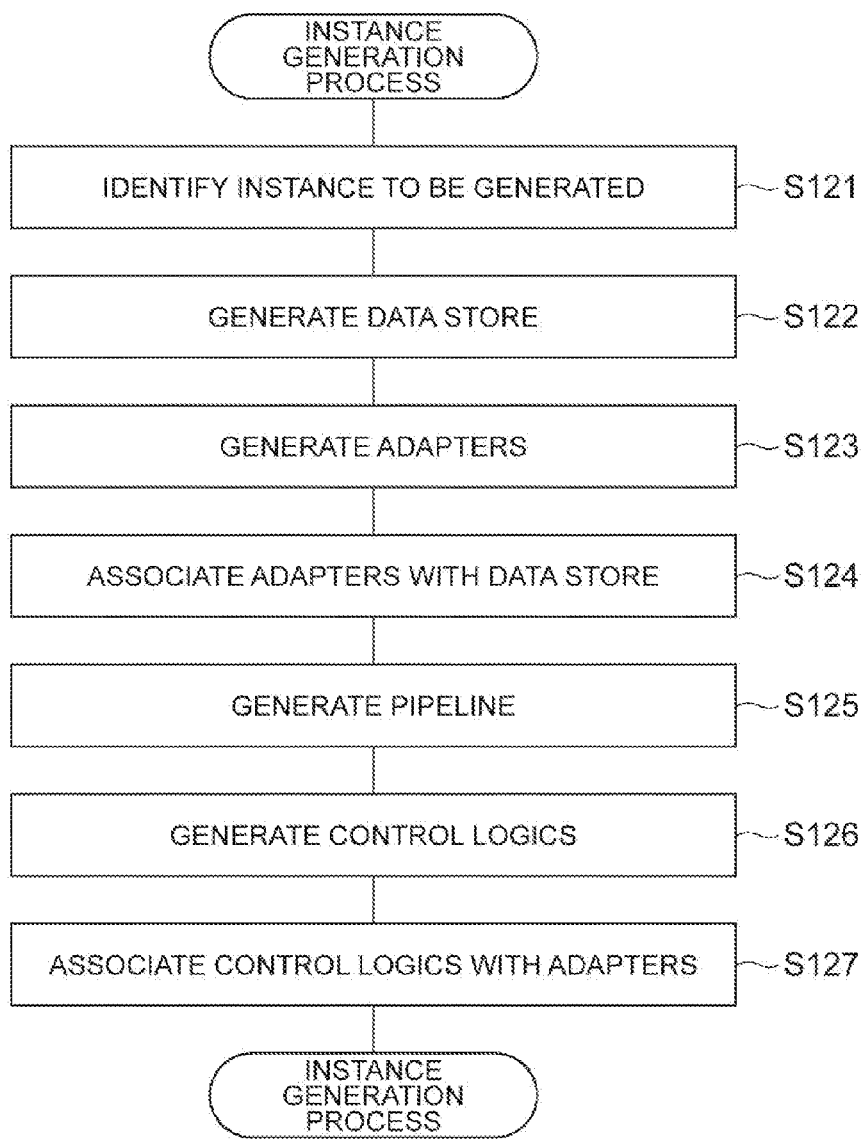
FIG. 10 is a flowchart of an instance generation process in FIG. 9.
Figure 11:
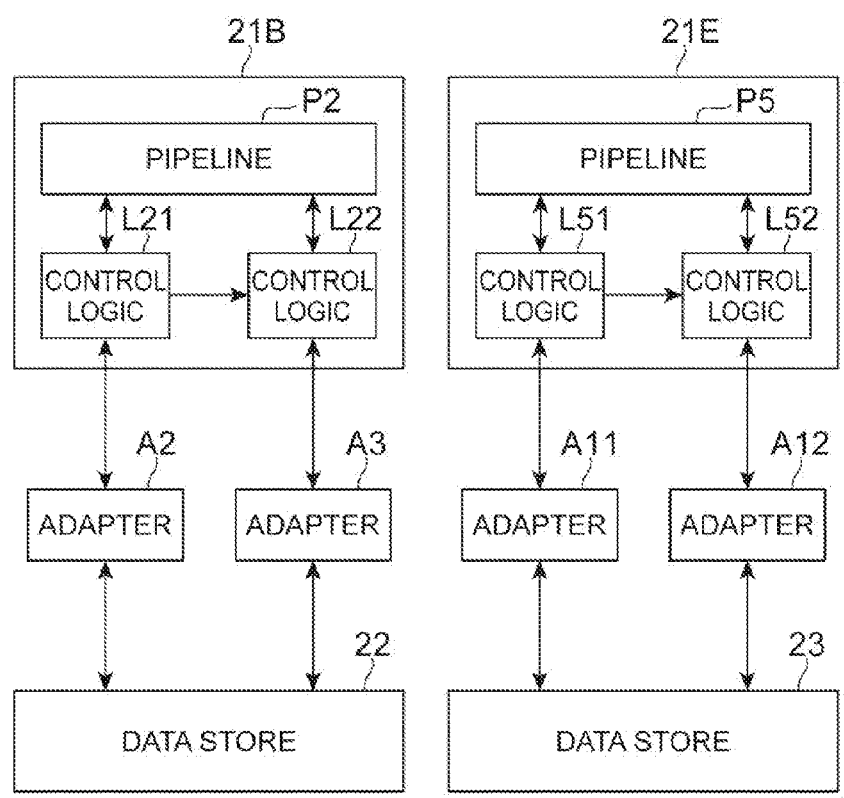
FIG. 11 is a diagram for explaining a state after the post-change process-component generation process in FIG. 9.
Figure 12:
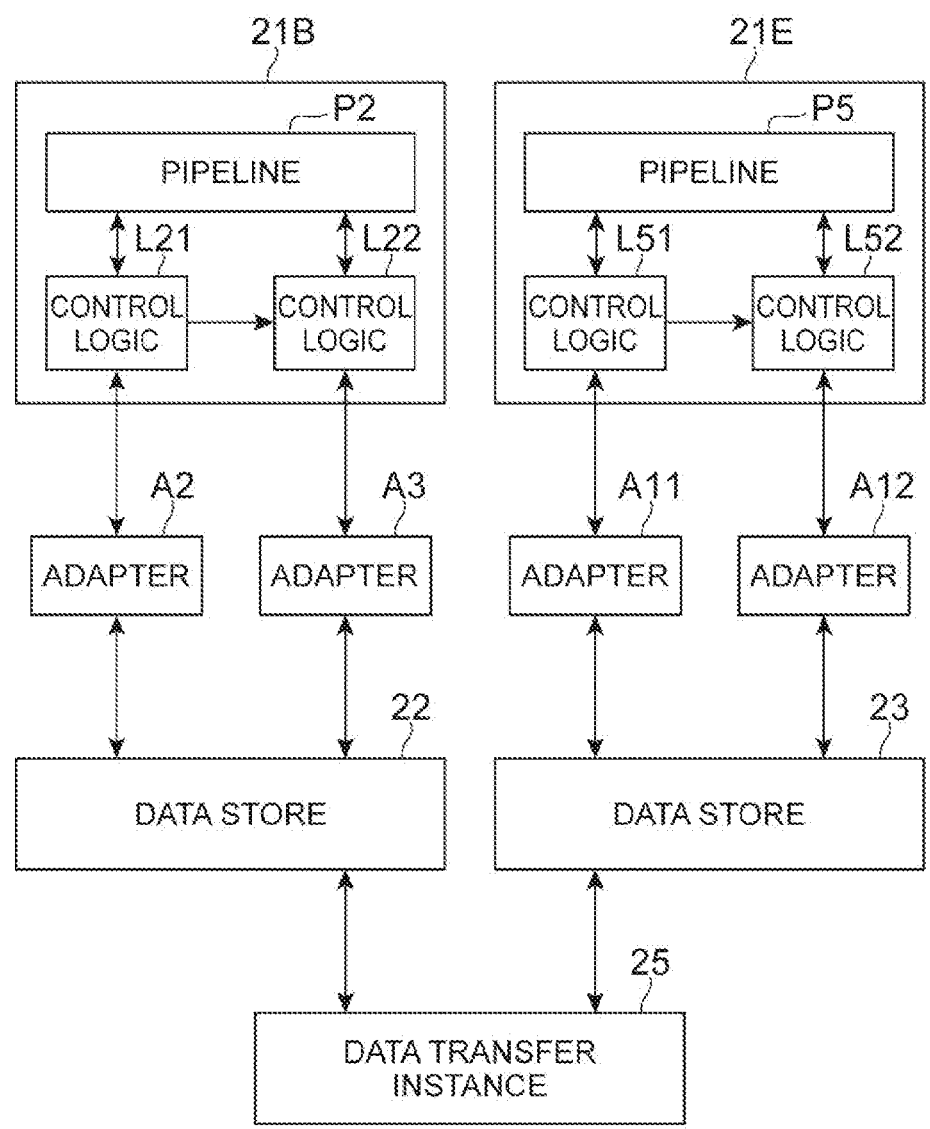
FIG. 12 is a diagram for explaining a data transfer process in FIG. 9.

Referring to FIG. 9 to FIG. 12, details of processes executed by the respective functional elements of the data change unit 50 will be described, and also the process flow of the data change unit 50 will be described. The following describes, as one example, a case in which the data store 22 depicted in FIG. 1 is changed to the data store 23 (post-change data store). Herein, explanation of part of the process flow of the data change unit 50 that has been already described in the explanation of the process flow of the process change unit 40 is omitted as appropriate. The method of changing each of the process components 21 to a different process component is the same between any process components 21, thus herein, attention is focused only on the process component 21B, and the description is made on a processing procedure when the data store 22 is changed to the data store 23 and the process component 21B is changed to a process component 21E associated with the data store 23. As depicted in FIG. 11 and FIG. 12, the process component 21E includes a pipeline P5 and two control logics L51 and L52.

As depicted in FIG. 9, to begin with, an information input process is executed by the information input unit 51 (step S11). The information input process is a process of inputting information for identifying a post-change data store, information for identifying a pre-change process component, and information for identifying a post-change process component with which the pre-change process component is to be replaced. The information input unit 51 acquires the information for identifying the post-change data store, the information for identifying the pre-change process component, and the information for identifying the post-change process component from the operator, for example, (external system 2) via the reception interface 10, for example. Herein, the post-change data store is the data store 23. Herein, because the description is made focusing only on the process component 21B as described above, the pre-change process component is the process component 21B, and the post-change process component is the process component 21E.

Subsequently, an instance generation process is executed by the instance generation unit 52 (step S12). The instance generation process is a process of generating the data store 23 and the process component 21E for post-change use and also connecting the process component 21E to the data store 23 via the adapters A.

FIG. 10 illustrates a specific flowchart of the instance generation process. As depicted in FIG. 10, the instance generation unit 52 inputs the information for identifying the post-change data store and the information for identifying the post-change process component from the information input unit 51 to identify the data store 23 and identify the pipeline P5 and the control logics L51 and L52 constituting the process component 21E (step S121). Subsequently, the instance generation unit 52 generates the identified data store 23 (step S122). Subsequently, the instance generation unit 52 generates the adapters A11 and A12 for accessing the data store 23 (step S123), and associates each of the adapters A11 and A12 with the data store 23 (step S124). Subsequently, the instance generation unit 52 generates the pipeline P5 (step S125). Subsequently, the instance generation unit 52 generates the control logics L51 and L52 identified at step S121, and associates each of the control logics L51 and L52 with the pipeline P5 (step S126). Subsequently, the instance generation unit 52 associates the control logics L51 and L52 with the adapters A11 and A12, respectively (step S127). Thus, the control logics L51 and L52 are connected to the data store 23 via the adapters A11 and A12.

FIG. 11 illustrates a state of the process component 21B and the process component 21E after the instance generation process is executed. At this time, the process component 21B is executing its processes, and the process component 21E is suspending its processes. In other words, the pipeline P5 is in the stop state, and the control logics L51 and L52 are in a state of being unable to execute their processes.

Subsequently, a pre-change process-component stop process is executed by the process-component stop unit 53 (step S13). The pre-change process-component stop process is a process of determining whether the process component 21B that is the pre-change process component is executing the corresponding processes, and putting the process component 21B into the stop state when it is determined that the process component 21B is not executing. The specific process flow of this pre-change process-component stop process is the same as the above-described process flow (see FIG. 6), and thus explanation is omitted.

Subsequently, a data transfer process is executed by the data transfer unit 54 (step S14). The data transfer process is a process of transferring data stored in the data store 22 to the data store 23 after the process component 21B is put into the stop state by the process-component stop unit 53. As depicted in FIG. 12, for example, the data transfer unit 54 may generate a data transfer instance 25 for data transfer that can access both of the data store 22 and the data store 23. The data transfer instance 25 is caused to perform data transfer (moving or copying of data) from the data store 22 to the data store 23, whereby data transfer from the data store 22 to the data store 23 can be performed.

Subsequently, a post-change process-component start process is executed by the process-component start unit 55 (step S15). The post-change process-component start process is a process of putting the process component 21E into the start state after the data transfer process (step S14). Specifically, the process-component start unit 55 changes the executable flag of the process component 21E into the start state. Accordingly, the process component 21E is put into a state of being able to execute the corresponding processes using the data stored in the data store 23, replacement of the data store 22 with the data store 23 has been completed, and replacement of the process component 21B with the process component 21E has been completed. Although only replacement of the process component 21B has been described herein for simplicity of description, the process components 21A and 21C can also be replaced with process components associated with the data store 23 in the same manner as the process component 21B.

After the processes to step S15 have been completed, the instance deletion unit 56 executes an instance deletion process of deleting instances that have become unnecessary from the RAM 102 (step S16). For example, the instance deletion unit 56 notifies the pipelines P and the control logics L of the process components 21A, 21B, and 21C for pre-change use of a deletion instruction. The pipelines P and the control logics L notified of the deletion instruction execute an ending process to be deleted from the RAM 102. The instance deletion unit 56 may delete also the adapters A and the data store 22 that have become unnecessary in the same manner.

As described above, the data change unit 50 generates the data store 23 for post-change use, generates the process component 21E that is the post-change process component, and connects the process component 21E to the data store 23 via the adapters A11 and A12. Subsequently, the data change unit 50 causes the data transfer unit 54 to transfer the data from the data store 22 for pre-change use to the data store 23 for post-change use after stopping the process component 21B that is the pre-change process component. Subsequently, the data change unit 50 causes the process-component start unit 55 to start the process component 21E after completion of the data transfer. This enables the process component 21E to access the data store 23. By the processes described above, replacement of both of the process components and the data stores can be performed reliably and easily by using a pre-established procedure. Thus, the transport control system 1 can prevent the entire system from being stopped for long period of time due to partial program change.

In the foregoing, the present invention has been described in detail based on the embodiment thereof. However, the present invention is not limited to the above-described embodiment. In the present invention, various modifications can be made within the scope not departing from the gist thereof.

In the present embodiment, one example has been described in which each process component 21 includes a pipeline P and one or more control logics L, but the process component does not necessarily have to have such an instance configuration. For example, each process component may be a single instance. In this case, a configuration in which each process component is directly associated with the corresponding adapter may be used. In the configuration of the present embodiment, an adapter is provided between each process component (control logic) and the corresponding data store so as to limit access from the process component to the data store. However, a configuration in which the process component is directly associated with the data store without providing the adapter may be used.

EXAMPLES

The following describes, as specific examples of data processing performed by the control application 20, a case (first example) in which a controller (transport control system 1) performs data processing for controlling operation of carriages (transport machines) and a case (second example) in which the controller performs data processing for controlling operation of conveyors.

First Example

In the first example, data processing will be described for a case in which the controller (transport control system 1) outputs instructions to be executed to carriages into each of which a control device configured to perform traveling control is incorporated, and the carriages execute the traveling control in accordance with the instructions. In this example, the carriages correspond to the external systems 2 and 3 in the above-described embodiment. In this data processing, each carriage transmits input data to the reception interface 10 of the controller at a timing, for example, when having stopped after completing a certain instruction (e.g., a process of traveling along a certain traveling route). The input data herein is information that associates, for example, an identifier (carriage number) of each carriage, an identifier (serial number) of an instruction indicating the execution of which has been completed (or is to be completed), the position (instruction completion position) of the carriage where the instruction has been completed (or is to be completed) with each other.

Subsequently, the control application 20 of the controller inputs the input data from the carriage via the reception interface 10, and executes data processing by the respective process components 21 and the data store 22. Note that, the data processing executed includes a process of calculating a destination to which the carriage should go next, for example, based on the instruction completion position of the carriage and a process of calculating an optimum route for reaching the calculated destination. The control application 20 executes the above-described data processing, and outputs output data to the transmission interface 30. Note that, the output data is information that associates, for example, an identifier of a carriage to be controlled, an identifier of a new instruction to the carriage, a destination of the carriage, and a traveling route of the carriage with each other.

Subsequently, the transmission interface 30 of the controller transmits the output data from the control application 20 to the carriage corresponding to the "identifier of a carriage to be controlled" associated with the output data. The carriage executes the traveling control based on the output data received from the transmission interface 30.

In the controller configured to execute the above-described data processing, it is assumed that a software update of a process component 21 (e.g., the process component 21B) (replacement with the different process component 21D) is performed.

To begin with, a case is assumed in which the controller needs to be shut down when the software update is performed. In this case, during the shutdown of the controller due to the software update, the reception interface 10 cannot receive input data from the carriages, and cannot return response messages to the carriages. Thus, the carriages will enter a state of waiting for response messages from the reception interface 10, and accordingly cannot execute another process. Furthermore, the transmission interface 30 cannot transmit the next instructions to the carriages. Accordingly, during a period (e.g., several seconds to several tens of seconds) after the software update of the process component 21B has been completed until the controller is started, the carriages cannot acquire instructions to be executed next, and thus cannot execute the traveling control. This may cause a problem in that transport of articles by the carriages takes several seconds to several tens of seconds longer.

Next, a case is assumed in which the software update of the process component 21B is performed without shutting down the controller as described in the above embodiment. Note that, such a software update that does not involve a shutdown of the controller is called "nonstop update". In this case, the reception interface 10 continuously execute the reception process, and thus can receive input data from the carriages and return response messages to the carriages. Furthermore, the transmission interface 30 can transmit the next instructions queued in the transmission data store 32 to the carriages. Thus, the carriages can execute the traveling control without being affected by the software update of the process component 21B. That is to say, the carriages can execute the traveling control for a stop period (period of time after the input data is transmitted to the reception interface 10 until the output data is received from the transmission interface 30) of the carriage which is the same as that when the software update of the process component 21B is not being executed.

Second Example

In the second example, data processing will be described for a case in which the controller outputs instructions to be executed to conveyors with each of which a control device provided to perform movement control of articles (control for transferring the articles onto another conveyor), and the conveyors execute the movement control of articles in accordance with the instructions. In this example, the conveyors correspond to the external systems 2 and 3 in the above-described embodiment. In this data processing, each conveyor transmits input data to the reception interface 10 of the controller at a timing, for example, when having detected that the conveyor has approached a position where an article on the conveyor can be moved onto the next conveyor. Note that, the input data is information that associates, for example, an identifier (conveyor ID) of each conveyor and an identifier (serial number) of an instruction the execution of which has been completed (or is to be completed) with each other.

Subsequently, the control application 20 of the controller inputs the input data from the conveyor via the reception interface 10, and executes data processing by the respective process components 21 and the data store 22. The data processing executed herein includes a process of determining onto which conveyor an article on the conveyor is moved, for example, based on information indicating a transport plan preset in the system. The control application 20 executes the above-described data processing, and outputs output data to the transmission interface 30. Note that, the output data is information that associates, for example, an identifier of a conveyor to be controlled, an identifier of a new instruction to the conveyor, and an identifier of a conveyor onto which the article is to be moved with each other.

Subsequently, the transmission interface 30 of the controller transmits the output data from the control application 20 to the conveyor corresponding to the "identifier of a conveyor to be controlled" associated with the output data. The carriage executes the traveling control based on the output data received from the transmission interface 30.

In the controller configured to execute the above-described data processing, it is assumed that a software update of a process component 21 (e.g., the process component 21B) (replacement with the different process component 21D) is performed.

To begin with, a case is assumed in which the controller needs to be shut down when the software update is performed. In this case, during the shutdown of the controller due to the software update, the reception interface 10 cannot receive input data from the conveyors, and cannot return response messages to the conveyors. Thus, the conveyors will enter a state of waiting for response messages from the reception interface 10, and accordingly cannot execute another process. Furthermore, the transmission interface 30 cannot transmit the next instructions to the conveyors. Accordingly, during a period after the software update of the process component 21B has been completed until the controller is started, the conveyors cannot acquire instructions to be executed next, and thus cannot know onto which conveyor the article should be transferred. The above-described movement control of articles requires short time control, and thus even if the stop time of the controller takes only about several hundreds of milliseconds, a slight delay in transmitting an instruction to a conveyor may cause a failure to transfer articles. This may cause a problem in that the conveyor stops abnormally and restarting the conveyor takes several minutes to several tens of minutes.

Next, a case is assumed in which the nonstop update is performed. In this case, the reception interface 10 continuously execute the reception process, and thus can receive input data from the conveyors and return response messages to the conveyors. Furthermore, the transmission interface 30 can transmit the next instructions queued in the transmission data store 32 to the conveyors. Thus, the conveyors can execute the movement control of articles without being affected by the software update of the process component 21B, which can prevent the abnormal stop of the conveyors due to the failure to transfer articles.

The controller (transport control system 1) that can perform the nonstop update as described above can effectively prevent increase in the stop time of the carriages or the conveyors, for example, due to partial software update of the controller, and consequently the operation stop time of a factory.

REFERENCE SIGNS LIST

1 . . . transport control system, 2, 3 . . . external system, 11 . . . reception-process component (reception-process execution unit), 12 . . . reception data store (reception data storage), 21, 21A, 21B, 21C, 21D . . . process component (process execution unit), 22, 23 . . . data store (data storage), 31 . . . transmission-process component (transmission-process execution unit), 32 . . . transmission data store (transmission data storage), 40 . . . process change unit, 41, 51 . . . information input unit, 42 . . . process-component generation unit (process generation unit), 43, 53 . . . process-component stop unit (process stop unit), 44, 55 . . . process-component start unit (process start unit), 50 . . . data change unit, 52 . . . instance generation unit (process generation unit), 54 . . . data transfer unit

The invention claimed is:

1. A transport control system configured to perform a series of data-processing operations for controlling transport of an article, the transport control system comprising:
　a plurality of process execution units configured to execute a plurality of mutually independent processes constituting the data-processing operations;
　at least one data storage configured to store therein a plurality of pieces of data input or output by the process execution units; and
　an adapter via which data is transferred between the process execution units and the data storage,
　wherein a first process execution unit out of the process execution units inputs data as a target of the data-processing operations, executes a predetermined process using the data, and outputs data obtained by executing this process to the data storage,
　each process execution unit between the first process execution unit and a last process execution unit out of the process execution units inputs data that is output to the data storage by a process execution unit immediately preceding this process execution unit, executes a predetermined process using the data, and outputs data obtained by executing this process to the data storage, and the last process execution unit out of the process execution units inputs data that is output to the data storage by a process execution unit immediately preceding this process execution unit, executes a predetermined process using the data, and outputs data obtained by executing this process as a processing result.

2. The transport control system according to claim 1 further comprising:
   a reception-process execution unit configured to operate independently of the process execution units and the data storage to receive data as a target of the data-processing operations from outside; and
   a reception data storage configured to operate independently of the process execution units and the data storage to store therein the data received by the reception-process execution unit, wherein
   the first process execution unit out of the process execution units inputs the data stored in the reception data storage.

3. The transport control system according to claim 1 further comprising:
   a transmission data storage configured to operate independently of the process execution units and the data storage to store therein data output as the processing result by the last process execution unit out of the process execution units; and
   a transmission-process execution unit configured to operate independently of the process execution units and the data storage to transmit the data stored in the transmission data storage to the outside, wherein
   The last process execution unit out of the process execution units outputs the data output as the processing result to the transmission data storage.

4. The transport control system according to claim 1 further comprising a process change unit configured to change a certain process execution unit out of the process execution units to a different process execution unit, wherein
   the process change unit includes:
      an information input unit configured to input information for identifying a pre-change process execution unit to be changed out of the process execution units and information for identifying a post-change process execution unit with which the pre-change process execution unit is to be replaced;
      a process generation unit configured to generate the post-change process execution unit;
      a process stop unit configured to determine whether the pre-change process execution unit is executing the corresponding process, and to put the pre-change process execution unit into a stop state of being unable to execute the process when it is determined that the pre-change process execution unit is not executing the process; and
      a process start unit configured to put the post-change process execution unit into a start state of being able to execute the process after the pre-change process execution unit is put into the stop state by the process stop unit.

5. The transport control system according to claim 4, wherein regardless of whether the process change unit is changing a certain process execution unit to a different process execution unit, each process execution unit preceding the certain process execution unit executes the corresponding process.

6. The transport control system according to claim 4, wherein regardless of whether the process change unit is changing a certain process execution unit to a different process execution unit, each process execution unit following the certain process execution unit executes the corresponding process when data output by the certain process execution unit is stored in the data storage.

7. The transport control system according to claim 6 further comprising a data change unit configured to change the data storage to a different data storage,
   wherein the data change unit includes:
      an information input unit configured to input information for identifying a post-change data storage with which the data storage is to be replaced, information for identifying a pre-change process execution unit to be changed out of the process execution units, and information for identifying a post-change process execution unit with which the pre-change process execution unit is to be replaced;
      a process generation unit configured to generate the post-change data storage and the post-change process execution unit;
      a process stop unit configured to determine whether the pre-change process execution unit is executing the corresponding process, and to put the pre-change process execution unit into a stop state of being unable to execute the process when it is determined that the pre-change process execution unit is not executing the process;
      a data transfer unit configured to transfer the data stored in the data storage to the post-change data storage after the pre-change process execution unit is put into the stop state by the process stop unit; and
      a process start unit configured to put the post-change process execution unit into a start state of being able to execute the process after the data is transferred by the data transfer unit.

* * * * *